United States Patent [19]

McConnell et al.

[11] 3,932,368

[45] Jan. 13, 1976

[54] POWDER COATING COMPOSITION COMPRISING A PARTICULATE FORM OF A CARBOXYLATED POLYOLEFIN

[75] Inventors: Richard L. McConnell; Robert B. Taylor; Peter M. Grant, all of Kingsport, Tenn.

[73] Assignee: Eastman Kodak Company, Rochester, N.Y.

[22] Filed: Nov. 21, 1973

[21] Appl. No.: 418,160

[52] U.S. Cl............... 260/78.4 D; 427/27; 427/421
[51] Int. Cl.² ..................... C08F 8/46; C25D 13/06
[58] Field of Search........... 260/78.4 D; 117/93.4 R, 117/127

[56] References Cited
UNITED STATES PATENTS

| | | |
|---|---|---|
| 3,322,711 | 5/1967 | Bush et al. .......................... 260/29.6 |
| 3,414,551 | 12/1968 | Reid et al. .......................... 260/88.2 |
| 3,450,560 | 6/1969 | Bacskai.............................. 117/132 |
| 3,481,910 | 12/1969 | Brunson............................. 260/78.4 |

*Primary Examiner*—John Kight, III.
*Attorney, Agent, or Firm*—Clyde L. Tootle; Daniel B. Reece, III

[57] ABSTRACT

A powder coating composition particularly useful in coating unprimed substrates which comprises a particulate form of a carboxylated polyolefin. The carboxylated polyolefin is prepared by reacting a polyolefin with an unsaturated dicarboxylic acid component. The carboxylated polyolefin has a saponification number of about 2 to about 12. The carboxylated polyolefin also has either a melt flow of from about 15 to about 175 g./10 minutes at 230°C. or a melt index of 5 to 75 at 190°C. The particulate form has a particle size of less than 20 mesh.

11 Claims, No Drawings

POWDER COATING COMPOSITION COMPRISING A PARTICULATE FORM OF A CARBOXYLATED POLYOLEFIN

This invention relates to powder coating compositions having particular utility for coating substrates including metals, by such means as electrostatic spraying, fluidized bed, and the like. In one specific aspect, this invention relates to a powder coating composition of a carboxylated polyolefin. Such carboxylated polyolefins can be prepared by reacting a polyolefin, such as polypropylene, and an unsaturated dicarboxylic component to prepare a carboxylated polyolefin having a saponification number of about 2 to 12.

Surface coating powders presently in commercial use generally comprise compositions based on poly(vinyl chloride), polyamides, plasticized cellulose acetate butyrate, certain polyesters which may contain flow aids such as modifying polymeric materials, and cross-linkable epoxy resins. Though useful, these materials have one or more drawbacks such as softness of the final coating, requirement of primer, need for a volatile plasticizer which causes fumes during curing, need for high curing temperatures, and need for flow aids. Therefore, it would be an advance in the state of the art to provide a powder coating composition having the full range of desirable characteristics including cost economy, good appearance, good toughness, good impact strength, good flexibility, good adhesion, good flowout, relatively low fusion temperatures, good pigmentability, and ease of preparation.

It is, therefore, an object of the present invention to provide powder coating compositions having a combination of desirable characteristics for coating substrates.

Another object of this invention is to provide a powder coating composition prepared from a carboxylated polyolefin.

A further object of the invention is to provide a carboxylated polyolefin powder coating composition which can be applied to substrates by electrostatic spraying, fluidized bed, and the like.

Another and further object of this invention is to provide articles having coatings applied thereto which are prepared from carboxylated polyolefins.

In accordance with this invention, a novel powder coating composition is provided which is prepared from carboxylated polyolefins. The carboxylated polyolefins contain small amounts of unsaturated dicarboxylic component, with or without minor amounts of other unsaturated acid materials, which are grafted onto normally solid polyolefins. These carboxylated polyolefins are relatively high melt flow rate (hereinafter M.F.) or melt index (hereinafter M.I.) materials which provide products which can be powdered and coated onto articles to provide a surface coating having a superior combination of coating properties.

The carboxylated polyolefins useful in the present invention are prepared by reacting high molecular weight poly-α-olefins with an unsaturated polycarboxylic component such as unsaturated polycarboxylic acids, anhydrides or esters thereof. Generally, the reaction is carried out in the presence of a free radical source. These high molecular weight poly-α-olefins include homopolymers prepared from alpha-olefin monomers containing 3 to 12 carbon atoms, copolymers of such monomers with each other or copolymers of such monomers and ethylene. The high molecular weight poly-α-olefins also include polyethylenes such as high, medium and low density polyethylenes having a melt index of about 10 to 80 as measured at 190°C. One such suitable high molecular weight poly-α-olefin is highly crystalline polypropylene prepared according to U.S. Pat. No. 2,969,345.

The poly-α-olefins are reacted with unsaturated polycarboxylic components such as unsaturated polycarboxylic acids, anhydrides or esters thereof at temperatures generally less than 300°C., preferably from about 130–240, in the presence of free radical sources. Suitable free radical sources are, for example, peroxides such as ditertiary butyl peroxide, t-butyl peracetate, t-butyl perbenzoate, or 2,5-dimethyl-2,5-di(tertiary butylperoxy)hexane. Suitable irradiation sources also include, for example, ultraviolet light. Preferably, about 1 to 15% of the unsaturated polycarboxylic component, such as unsaturated polycarboxylic acids, anhydrides or esters thereof, based on the weight of the polyolefin, is used in preparing the carboxylated polyolefin used in the invention.

The carboxylated polyolefins useful in the present invention can be prepared either in solution, in solvents such as xylene, mineral spirits and the like, at temperatures of about 130°–200°C. or in the melt phase at temperatures of about 180°–240°C. When the carboxylated polyolefins are prepared in solution, the polyolefin is generally dissolved in refluxing solvent, for example xylene at 140°C., and the unsaturated polycarboxylic component, maleic anhydride, and peroxide initiator dissolved in solvent are added dropwise to the reaction mixture.

The amount of unsaturated component used is determined by the reaction process employed. For example, in a solution process, the unsaturated component may be present in an amount of about 1 to 15 weight percent. However, in a melt phase reaction, the unsaturated component is preferably present in an amount of about 1 weight percent. The amount of peroxide or free radical agent used is generally quite low being of the order of about 0.01 to about 0.5% based on the weight of the poly-α-olefin.

The reaction may be carried out either in a batchwise or in a continuous manner with contact times in the order of about 1 minute to about 2 hours. The reaction of polyethylenes should be carried out in the absence of oxygen, preferably in an inert nitrogen atmosphere. The reaction of polypropylene and higher α-olefins preferably is carried out in an inert atmosphere. Suitable unsaturated polycarboxylic component such as acids and anhydrides are, for example, maleic acid, maleic anhydride, fumaric acid, citraconic anhydride, aconitic anhydride and itaconic anhydride. Suitable esters are, for example, the half or full esters derived from maleic and fumaric acid such as methyl ethyl fumarate, dimethyl maleate, dimethyl fumarate, methyl ethyl maleate, dibutyl maleate, dipropyl maleate, and the like. The carboxylated polypropylene, higher α-olefin homopolymers and copolymer compositions have a melt flow rate of 15 to 175 at 230°C. and a saponification number of 2 to 12, preferably about 4–8. The carboxylated polyethylene compositions have a melt index of 5 to 75 at 190°C. and a saponification number of 2 to 12.

The unreacted, unsaturated polycarboxylic component can be separated from the reaction mixture by purging the reaction mixture with an inert gas while the melt temperature is between 200° and 300°C. After the unreacted unsaturated polycarboxylic component has been removed, the modified poly-α-olefin can be further purified by vacuum stripping, solvent extraction, and isolated by removing the solvent.

One method for the determination of saponification number of maleated polypropylene is as follows: Weigh approximately 4 g. of the sample into a 500 ml. alkali-resistant Erlenmeyer flask and add 100 ml. distilled xylene. Heat under a reflux condenser for 1 hour. Cool the solution to 75°C. or less, and add from a buret 30 ml. standardized .10 N KOH in ethyl alcohol. Heat under reflux for 45 minutes. Cool and add from a buret standardized .10 N $CH_3COOH$ in xylene until the mixture is acid to phenolphthalein. Add at least 1 ml. excess $CH_3COOH$. Reheat the solution under reflux for 15 minutes. Remove from heat, add 5 ml. water, and titrate to a faint pink end point with .10 N KOH in ethyl alcohol. Run a blank in this manner using the same amounts of reagents and the same heating times.

Calculation:
$$\frac{[(ml.\ KOH \times N)(ml.\ CH_3COOH \times N)]\ \text{(For sample)} - [(ml.\ KOH \times N)(ml.\ CH_3COOH \times N)]\ \text{(For blank)} \times 56.1}{g.\ \text{Sample}} = \text{Sap. No.}$$

A particularly useful powder coating of the present invention is a carboxylated polyolefin of normally solid polypropylene containing from about 0.2 to about 1.5%, preferably 0.4 to 0.8%, by weight based on the polypropylene of an unsaturated dicarboxylic acid component. Preferably, at least 75 mole percent of the unsaturated dicarboxylic acid component is derived from maleic anhydride. The carboxylated polypropylene has a saponification number of 2 to 12 and a melt flow of from about 15 to about 175 g./10 minutes at 230°C., preferably 55 to 100, and is processable into a powder which can be applied to substrates and fused to form smooth, tough coatings.

One particular process for preparing a carboxylated polypropylene is to graft maleic anhydride to crystalline polypropylene. Such grafting can be carried out, for example, by a melt-phase reaction in a compounding extruder or Banbury mixer using a peroxide initiator. When cryogenically ground to less than about 20 mesh size powder, these carboxylated materials can be conveniently coated on substrates using a fluidized bedcoating process and, when ground to less than about 100 mesh size powder, can be electrostatically spray coated onto substrates such as metal panels including umprimed steel or aluminum, and other such suitable chargeable substrates. The coated panels are fused at about 350°F. to provide smooth coatings which have such properties as good appearance, adhesion, flexibility, toughness, impact strength and the like. The coating may also be quenched to further improve its gloss.

In preparing the graft copolymers, the polypropylene which can be in pellet or powder form may be coated with the desired amount of unsaturated dicarboxylic acid component containing generally about 0.02–0.2% by weight, based on polymer weight, of dissolved free-radical initiator. Alternatively, the polypropylene and the dicarboxylic acid component containing the peroxide can be fed to the extruder in separate stream. The polypropylene useful for such reaction is crystalline and has a conditioned density as determined by ASTM D-1505 of at least about 0.90 up to about 0.93 and a melt flow rate (M.F.) as determined by ASTM D-1238 of from about 0.1 to about 60.0. Representative technology for preparing such polypropylene is found, for example, in the disclosures of U.S. Pat. Nos. 3,549,608; 3,412,078; and 3,112,300. The preferred range of initiator is about 0.04–0.10% by weight, based on polymer weight. Typical free-radical initiators useful in this process include 2,5-dimethyl-2,5-di(t-butylperoxy)-hexane, di-t-butyl peroxide, t-butyl peracetate, and t-butyl perbenzoate. In general, it is beneficial to use a peroxide initiator which has a half life of about 2 to 60 seconds at 200°C. Reaction temperatures of about 175° to 260°C. are operable but the 180°–240°C. range is preferred. Suitable monomer concentrations include 0.3 to 2.0% by weight based on polymer weight; however, preferably 0.75 to 1.25% monomer based on the polymer weight.

Graft copolymers having a saponification number of about 2 (0.2% combined maleic anhydride) to 12 (1.5% combined maleic anhydride) and an M.F. of about 15 to 175 g./10 minutes at 230°C. are generally suitable to provide smooth fused powder coatings which have such properties as good appearance, flexibility, adhesion, toughness and impact strength. These compositions also provide good protective coatings for preventing rusting of steel members or structures. One particular graft copolymer which has an excellent combination of properties has a saponification number of 4 to 8 and an M.F. of from 55 to about 100.

In some cases it appears to be desirable to start with a low M.F. polypropylene (e.g., M.F. 0.1–40) and degrade the molecular weight of the polymer during the grafting step to the desired melt-flow. In these cases it is necessary to use higher reaction temperatures and a higher peroxide concentration. In other cases where higher melt flow polypropylene is employed, e.g., up to about 60 or more, it is usually necessary to lower the peroxide concentration and employ milder reaction conditions.

The graft copolymer may preferably be stabilized against thermal, oxidative and ultraviolet radiation degradation by addition of various polyolefin stabilizers such as, for example: dilauryl thiodipropionate; 2,6-dioctadecyl-p-cresol; 4,4'-butylidene bis(6-t-butyl-m-cresol); 4-dodecyloxy-2-hydroxybenzophenone; pentaerythritol tetrakis[3-(3,5-di-t-butyl-4-hydroxyphenyl)-propionate]; dioctadecyl 3,5-di-t-butyl-4-hydroxybenzyl phosphonate; 4,4'-methylene bias(2,6-di-t-butylphenol); 2-(3,5-di-t-amyl-2-hydroxyphenyl)benzotriazole and combinations thereof.

It is frequently desirable to incorporate white or colored pigments or fillers, such as $CaCO_3$, in the graft copolymer compositions, sometimes in high concentrations. These pigments and fillers may readily be added at the same time as the stabilizers. For example, stabilizers, fillers and pigments are preferably added to the graft copolymers in extruders or Banbury mixers. For the nonpigmented material, coating the pellets with stabilizers from a solution thereof is quite satisfactory. Typical useful pigments include titanium dioxide (Ti-Pure R100), calcium carbonate, talc, Zulu Blue 4849 (Harshaw Chemical Co.), Ultramarine Blue C.I. No. 1290 (Hartman -Leddon Co.), Monastral Red B-742D (Du Pont), Monastral Green 710D (Du Pont), carbon black and the like. It is frequently desirable to prepare masterbatches of graft copolymer containing high concentrations, such as 30 to 60% by weight based on total masterbatch composition of pigment, filler or the like and then mix the masterbatch with additional graft copolymer in a subsequent operation to provide desired pigment or filler levels, generally 2 to 30% by weight based on total, final composition. In order to provide soft or pastel colors, mixtures of TiO₂ and colored pigments may be employed.

This invention will be further illustrated by the following examples although it will be understood that these examples are included merely for purposes of illustration and are not intended to limit the scope of the invention.

EXAMPLE 1 - Preparation of Carboxylated Polypropylene by Reaction by a Solution Process in p-Xylene The reaction apparatus consists of a 5-liter, 3-necked flask fitted with a mechanical stirrer, a water condenser, and a dropping funnel. Polypropylene (250 g.) having a melt flow of 4.5 g./10 min. at 230°C., an I. V. of 1.68 in Tetralin at 145°C., and a density of 0.912 g./cc. and maleic anhydride (37.5 g.) are added with stirring to 2850 ml. of p-xylene. This reaction mixture is heated to reflux, approximately 140°C. After the polymer and maleic anhydride are dissolved in the refluxing xylene, 50 ml. of p-xylene solution containing 1.82 g. 2,5-dimethyl-2,5-di(t-butyl peroxy)hexane (available commercially as Lupersol 101) (0.0025 mole/100 g. of polymer) are added in a rapid dropwise manner from the dropping funnel. After addition of the peroxide solution, the reaction mixture is allowed to reflux for 1 hour. After cooling with stirring for 15 minutes, the hot reaction mixture is poured into a large beaker, covered, and allowed to cool to room temperature. The reaction mixture (partially gel) is then poured into 4000 ml. of acetone to precipitate the maleated polypropylene product. The precipitated polymer is suction filtered and washed twice with 2000 ml. of acetone in a large Waring Blender followed each time by suction filtration. The white, powdery product is placed in a large Pyrex dish and stabilized by thoroughly wetting with a 120 ml. acetone solution containing 0.5 g. of pentaerythritol tetrakis[3-(3,5-di-tert-butyl-4-hydroxyphenyl)- propionate] and 0.5 g. of dilauryl thiodipropionate (0.2% of each based on polymer). The maleated polymer is allowed to air dry for 1 hour and then is dried for 48 hours in a vacuum oven at 60°C. After drying, 20 g. of the maleated polypropylene is stripped under vacuum (<1mm.) at 200°C. to remove traces of maleic anhydride. This stripped sample has a M.F. of 60 and a saponification number of 9.1 (corresponds to 0.8% combined monomer based on polymer).

The dried, maleated polypropylene is ground with liquid nitrogen in a Wiley mill using a 0.5-mm. screen. The powder obtained by grinding is sieved for 1 hour to obtain the portion that is <140 mesh in size.

The <140 mesh powder is electrostatically sprayed, using a Gema AG Electrostatic Powder Spray Apparatus at a potential of 60 kv., onto unprimed bonderized steel test panels. The coated test panels are placed in a 350°F. hot air circulating oven for 10 minutes to allow the powder to fuse and flow out. The fused powder coating is transparent and very smooth. The fused powder coating passes the cross-hatched cellophane tape adhesion test and the ⅛-inch conical mandrel bend flexibility test. It has a Gardner impact strength (in. lb.) of >80/>80 (front/reverse) and pencil hardness of HB.

Similarly good coatings are obtained when maleated polypropylene of this example in the form of 100–150 mesh powder is electrostatically sprayed on unprimed steel, aluminum, copper or bronze plates and fused for 10 minutes at 350°F.

EXAMPLE 2 - PREPARATION OF CARBOXYLATED POLYPROPYLENE BY MELT PHASE REACTION IN AN EXTRUDER

Pellets of polypropylene (400 g.) having a melt flow of 4.5 are coated with an acetone solution which contains maleic anhydride (1% based on polymer) and 0.46 g. of 2,5-dimethyl-2,5-di(t-butyl peroxy)hexane (approximately 0.12% based on polymer). After allowing the acetone to evaporate, the coated pellets are passed through a Brabender extruder at 200°C. with a contact time of 90 seconds. The maleated polymer is stabilized with 0.2% dilauryl thiodipropionate (DLTDP) and 0.2% dioctadecylp-cresol (DOPC). It is then stripped at 200°C. and <1 mm. pressure for 3 hours to remove the uncombined maleic anhydride. The stripped sample is colorless and it has a saponification number of 2.6 (0.23% combined maleic anhydride) and a melt flow rate of 56 g./10 minutes at 230°C. Thus, we have considerably lowered the molecular weight of the polypropylene during the extrusion operation.

The stabilized, maleated polypropylene is cryogenically ground, using liquid nitrogen, in a Bantam Mikro-Pulverizer (hammermill) and then sieved to obtain the powder which passes through 150 mesh. Powder which is larger than 150 mesh is mixed with unground maleated polymer and recycled into the hammermill.

The <150 mesh powder is electrostatically sprayed, using a Gems AG Electrostatic Powder Spray Apparatus at a potential of 60 kv. onto unprimed bonderized steel test panels. The coated panels are placed in a 350°F. hot air circulating oven for 10 minutes to allow the powder to fuse and flow out. The fused powder coating has good appearance and toughness. For example, it has no cratering or orange peel, passes the cross hatched cellophane tape adhesion test, passes the ⅛-inch conical mandrel bend test, and has a Gardner impact strength of >80/40 in. lb. (front/reverse).

EXAMPLE 3 - PREPARATION OF CARBOXYLATED POLYPROPYLENE BY MELT PHASE REACTION IN AN EXTRUDER

Maleic anhydride (1% based on polymer) is grafted to polypropylene having a melt flow of approximately 60 and a density of 0.915 g./cc., using the procedure of Example 2 except that the extrusion temperature is 180°C. and the peroxide is tert-butylperoxypivalate (1.74% based on polymer) instead of 2,5-dimethyl-2,5-di(t-butyl peroxy)hexane. A stripped sample which has been stabilized with 0.2% DLTDP and 0.2% DOPC has a saponification number of 4.7 and a M. F. of 58. Thus, the melt flow rate of the polymer is not substantially changed when tert-butylperoxypivalate is used as the initiator.

This maleated polymer is ground according to the procedure of Example 2 to provide <150 mesh powder. When electrostatically spray coated on unprimed bonderized steel tests panels and fused at 350°F., it provides a smooth coating having no craters or orange peel. This coating passes the crosshatched cellophane tape test and has a Gardner impact strength of >80/20 in. lb. (front/reverse). However, it cracks at the bend in the ⅛-inch conical mandrel bend test. Thus, coatings made with this maleated polypropylene (M. F. 58) are not as flexible as those made from maleated polypropylene in which high-molecular-weight polymer (low melt flow rate polymer) is simultaneously maleated and degraded in molecular weight to provide material with M. F. of 56 as in Example 2.

EXAMPLE 4 - UNMODIFIED POLYPROPYLENE CONTROLS

Unmodified polypropylene stabilized with 0.2% DLTDP and 0.2% DOPC and having a melt flow rate of 4.5 and conditioned density of 0.912 is cryogenically ground according to the grinding procedure described in Example 2. The powder obtained is then sieved and the portion which passes through a 150 mesh screen is electrostatically sprayed onto unprimed bounderized steel test panels. The coated panels are placed in a 350°F. hot air circulating oven for 10 minutes to allow the powder to fuse and flow out. The coated panels have a poor appearance (streaked surface) and the coatings have poor flexibility (polymer coating ruptures and peels away from metal at the bend in the conical mandrel bend test), poor adhesion (polymer adheres to cellophane tape and pulls away from the metal in the crosshatched cellophane tape test), and poor impact strength (Gardner impact strength of 30 and <10 in. lb. on front and reverse side of panel, respectively).

Similarly poor results are obtained when <150 mesh powder from unmodified crystalline polypropylenes having melt flow rates of 15, 30 and 60 are fused on metal panels.

EXAMPLE 5 - PREPARATION OF CARBOXYLATED POLYETHYLENE IN A SOLUTION PROCESS IN P-XYLENE

Polyethylene having a melt index of 30 g./10 min. at 190°C., an I. V. of 0.67; and a density of 0.925, is maleated in p-xylene using maleic anhydride (5% based on polyethylene) and 2,5-dimethyl-2,5-di(t-butyl peroxy)hexane (0.73% based on polyethylene) using the procedure described in Example 1. The polymer is stripped and stabilized with 0.2% DLTDP and 0.2% pentaerythritol tetrakis[3-(3,5,-di-tert-butyl-4- hydroxyphenyl)propionate[ as described in Example 1. This material has a melt index of 18.1, I. V. of 0.68, and a saponification number of 11.4 (1% combined maleic anhydride). Powder (<140 mesh) is electrostatically sprayed on unprimed bonderized steel panels and fused at 350°F. for 10 minutes.

The coating has a good appearance with very slight cratering. It has a pencil hardness of less than 6B, passes the crosshatched cellophane tape test, passes the ⅛-inch conical mandrel bend test, and has a Gardner impact strength of >80/>80 (front/reverse).

The fused powder coating of unmodified low-density polyethylene (Tenite 1917 polyethylene; melt index 30) has both a poor surface appearance and poor adhesion (failed crosshatched cellophane tape test).

EXAMPLE 6 - PREPARATION OF CARBOXYLATED HIGH DENSITY POLYETHYLENE BY REACTING MALEIC ANHYDRIDE WITH HIGH DENSITY POLYETHYLENE IN A SOLUTION PROCESS IN P-XYLENE

High density polyethylene having a melt index of 32 g./10 minutes at 190°C., an I.V. of 0.87, and a density of 0.965 is maleated in p-xylene using maleic anhydride (5% based on polyethylene) and 2,5-dimethyl-2,5-di(t-butyl peroxy)hexane (0.73% based on polyethylene) using the procedure described in Example 1. The maleated polyethylene is stripped and stabilized with 0.2% DLTDP and 0.2% pentaerythritol tetrakis[3,5-di-tert-butyl-4-hydroxyphenyl)propionate] as described in Example 1. This material has a melt index of 10.3, I.V. of 0.95, and s saponification number of 11.4 (1% combined maleic anhydride). Powder (<140 mesh) is electrostatically sprayed on unprimed bonderized steel panels and fused at 350°F. for 10 minutes. The coating has a good appearance with only very slight cratering. It has a pencil hardness of 4B, passes the crosshatched cellophane tape test, passes the ⅛-inch conical mandrel bend test, and has a Gardner impact strength of >80/20 (front/reverse).

The fused powder coating of unmodified high density polyethylene )melt index 32 ) has poor appearance, poor adhesion (failed crosshatched cellophane tape test), poor flexibility (failed conical mandrel test) and poor impact resistance [Gardner impact strength of <10/<10 (front/- reverse)].

The carboxylated polyolefin coating compositions of the present invention provide coatings having an excellent combination of physical properties. These coatings can be spray coated on metal panels, such as unprimed bonderized steel, and fused at 350°F. to provide smooth coatings having excellent appearance as well as protection against rusting, for example.

Although the invention has been described in considerable detail with particular reference to certain preferred embodiments thereof, it will be understood that variations and modifications can be effected within the spirit and scope of the invention.

We claim:

1. A powder coating composition particularly useful in coating unprimed substrates which comprises a particulate form of a carboxylated polyolefin selected from the group consisting of carboxylated polyethylene compositions having a melt index of 5 to 75 at 190°C. and carboxylated homo- and copoly-α-olefins prepared from alpha olefin monomers containing 3 to 12 carbon atoms and copolymers of such monomers and ethylene having a melt flow rate of 15 to 175 g./10 minutes at 230°C., said polyolefin having a saponification number of about 2 to about 12, said particulate form having a particle size less than 20 mesh.

2. A powder coating composition according to claim 1 wherein said carboxylated polyolefin is a carboxylated polypropylene 3. A powder coating composition according to claim 2 wherein said carboxylated polypropylene is a maleated polypropylene.

4. A powder coating composition according to claim 3 wherein said melt flow is from about 55 to about 100 g./10 minutes at 230°C.

5. A powder coating composition according to claim 4 wherein said carboxylated polyolefin is a carboxylated polypropylene.

6. A powder coating composition according to claim 5 wherein said carboxylated polypropylene is a maleated polypropylene.

7. A powder coating composition according to claim 6 wherein said particulate form has a particle size less than 100 mesh.

8. A powder coating composition according to claim 1 wherein said carboxylated polyolefin is a carboxylated polyethylene.

9. A powder coating composition according to claim 8 wherein said carboxylated polyethylene is maleated polyethylene.

10. A substrate having thereon an electrostatically deposited coating comprising a particulate form of less than 20 mesh size of a carboxylated polyolefin selected from the group consisting of carboxylated polyethylene and carboxylated homo-and copoly-a-olefins prepared from alpha olefin monomers containing 3 to 12 carbon atoms and copolymers of such monomers and ethylene having a saponification number of about 2 to about 12, a melt flow of from about 15 to about 175 g./10 minutes at 230°C and a melt index of 5 to 75 at 190°C.

11. A substrate having thereon an electrostatically deposited coating comprising a particulate form of less than 20 mesh size of a carboxylated polyethylene having a saponification number of about 2 to about, 12 a melt index of 5 to 75 at 190°C and a melt flow of 15 to 175 g./10 minutes at 230°C.

* * * * *